United States Patent [19]

Harrod et al.

[11] Patent Number: 5,640,831

[45] Date of Patent: *Jun. 24, 1997

[54] FORMING AN ENVELOPE HAVING A DIE CUT WINDOW AND CONTAINING INSERTS

[75] Inventors: Jimmie A. Harrod, Grand Island; John F. Slyster, Jr., Lockport, both of N.Y.

[73] Assignee: Moore Business Forms, Inc., Grand Island, N.Y.

[*] Notice: The term of this patent shall not extend beyond the expiration date of Pat. No. 5,568,717.

[21] Appl. No.: 514,383

[22] Filed: Aug. 11, 1995

Related U.S. Application Data

[63] Continuation-in-part of Ser. No. 40,034, Mar. 30, 1993, Pat. No. 5,568,717.

[51] Int. Cl.[6] ............ B65B 11/18; B65B 11/26; B65B 11/48; B65B 43/00
[52] U.S. Cl. ............ 53/429; 53/435; 53/460; 53/462; 53/116; 53/206; 53/520
[58] Field of Search ............ 53/460, 461, 462, 53/435, 154, 155, 231, 233, 237, 238, 244, 569, 520, 206, 284.3, 116, 429

[56] References Cited

U.S. PATENT DOCUMENTS

| | | |
|---|---|---|
| 1,039,786 | 10/1912 | Novick . |
| 3,059,391 | 10/1962 | Volks et al. . |
| 3,350,988 | 11/1967 | Schultz .................................. 53/460 |
| 3,457,696 | 7/1969 | Berkley . |
| 3,618,284 | 11/1971 | Gendron . |
| 3,897,720 | 8/1975 | Hiersteiner .......................... 53/460 X |
| 4,071,997 | 2/1978 | Gunther, Jr. et al. . |
| 4,091,596 | 5/1978 | Jones ................................... 53/460 |
| 4,312,169 | 1/1982 | Golicz et al. . |
| 4,343,129 | 8/1982 | Gunther, Jr. et al. . |
| 4,411,643 | 10/1983 | Higginson . |
| 4,437,852 | 3/1984 | Volk, Jr. et al. . |
| 4,454,980 | 6/1984 | Poehler . |
| 4,455,809 | 6/1984 | Dallaserra .......................... 53/435 |
| 4,464,878 | 8/1984 | Golicz et al. . |
| 4,531,993 | 7/1985 | Bradley ............................. 53/460 X |
| 4,694,631 | 9/1987 | Gunther, Jr. . |
| 4,694,632 | 9/1987 | Gunther, Jr. . |
| 4,731,048 | 3/1988 | Marella et al. . |
| 4,731,142 | 3/1988 | Stenner . |
| 4,969,594 | 11/1990 | Ashby ............................... 53/460 X |
| 5,005,337 | 4/1991 | Kluth ................................ 53/462 X |
| 5,117,610 | 6/1992 | Hartman et al. .................. 53/520 X |
| 5,155,973 | 10/1992 | Hipko et al. .................... 53/460 X |
| 5,180,154 | 1/1993 | Malick . |
| 5,282,350 | 2/1994 | Crowley .......................... 53/520 X |
| 5,282,614 | 2/1994 | Kalisiak et al. . |

*Primary Examiner*—Horace M. Culver
*Attorney, Agent, or Firm*—Nixon & Vanderhye P.C.

[57] ABSTRACT

A plurality of interconnected envelope blanks are formed from an envelope web of paper. Die cut windows are also formed in each envelope blank of the interconnected web and transparent window patches are adhesively secured over the die cut window. A plurality of inserts from insert webs of paper are formed and may be variably imaged. The inserts are collected and disposed on the interconnected envelope blanks with address information registering through the window. The interconnected blanks and web form with inserts applied are severed to form discrete envelope blanks and later folded and glued to form complete mailers.

35 Claims, 6 Drawing Sheets

FORMING AN ENVELOPE HAVING A DIE CUT WINDOW AND CONTAINING INSERTS

RELATED APPLICATIONS

This application is a continuation-in-part of application Ser. No. 08/040,034, filed Mar. 30, 1993, and now U.S. Pat. No. 5,568,717, for "Forming an Envelope Around Inserts."

TECHNICAL FIELD

Organizations that do large mailings continuously seek to produce envelopes stuffed with inserts in as efficient and fast a manner as possible. However at the same time, it is often desirable to provide variably imaged indicia on the inserts provided in the envelope, which requires intelligent matching of the inserts with the envelope, and/or the inserts with each other. Die cut windows, with or without a registering transparent patch are also frequently used for exposing to view address information internal to the mailing envelope.

BACKGROUND

One particularly suitable general technique for large volume production of insert-stuffed mailing envelopes is to form the envelopes around the inserts. Typically this is accomplished by applying adhesive on individual envelope blanks, placing the inserts in contact with the envelope blanks, and by a combination of plough and buckle folding, forming the envelope blanks around the inserts with the adhesive portions sealing the envelope together. While such techniques are certainly effective, it is desirable to be able to produce the final stuffed mailing envelopes at higher speed than is conventionally provided.

DISCLOSURE OF THE INVENTION

According to the present invention, high speed production of stuffed mailing envelopes is accomplished. The invention is particularly advantageous in that the entire mailing envelopes can be constructed starting with individual rolls of paper. Additional pre-formed cut sheet inserts can also be added, if desired.

The invention is also advantageous in that all scoring and subsequent flap folding is accomplished by parallel plough folders, allowing considerably higher operating speeds for thick, bulky, and variable random thickness inserts which typically have trouble traversing standard buckle folding devices. Also, according to the invention the inserts produced from the webs of paper are web collated, which is faster, more reliable, and more efficient than collating individual personalized sheets, and the inserts are placed on the envelope blanks while the envelope blanks are still in web form, again optimizing speed while minimizing handling difficulties. Further, when the final mailing envelope is being formed, it is moved from traveling in a first direction to traveling in a second substantially transverse direction by utilizing a 45° conveying mechanism, which positively contains the inserts on the envelope blank face while facilitating high speed transfer.

According to one aspect of the present invention a method of automatically forming a mailing envelope with a plurality of contained insert sheets from at least one insert web of paper and an envelope web of paper is provided. The method comprises the steps of continuously and automatically: forming at least one insert from the at least one insert web of paper, including by cutting the insert from the web, and folding the insert, to produce a formed insert; forming a plurality of interconnected envelope blanks from the envelope web of paper; collecting and placing a plurality of insert sheets, including the formed insert, on each of the plurality of interconnected envelope blanks while they are interconnected, in web form; and then, while conveying the interconnected blanks in web form, severing the interconnected envelope blanks from each other to produce individual blanks, and forming each individual blank around the inserts placed thereon to produce a final mailing envelope containing a plurality of insert sheets.

Forming the interconnected envelope blanks is typically practiced to form each blank so that it has two parallel minor flaps on opposite edges thereof, and after severing has two parallel major flaps on opposite edges. Also, while conveying the interconnected blanks in web form in a first direction, the method hereof is practiced by sequentially plough folding over the minor flaps; severing the leading interconnected blank from the next blank so that both major flaps are free; then changing the direction of conveyance and sequentially applying adhesive to the major flaps; and plough folding the major flaps so that adhesive applied thereto comes into contact with the minor flaps and the other major flap, to form a sealed mailing envelope containing inserts. Prior to plough folding the minor flaps and placing the inserts on the web, the envelope blanks are preferably scored at the minor flaps to facilitate plough folding of the minor flaps. The blanks are scored at the major flaps just prior to applying adhesive thereto. Typically the step of forming the interconnected envelope blanks is further practiced to form envelope blanks having, after severing, a large major flap and a small major flap, the large and small major flaps having parallel end edges, and each having a pair of side edges generally parallel to the end edges; and wherein adhesive is applied by placing adhesive adjacent each of the side edges of the large major flap, and adjacent the end edge of the small major flap. The step of plough folding the major flap is preferably practiced by first plough folding the large major flap so that the adhesive thereon comes into contact with the minor flap, and then plough folding the small major flap so that the adhesive thereon comes into contact with the large major flap.

The step of forming the inserts may be practiced by forming a plurality of inserts from a plurality of webs of paper and subsequently aligning the inserts while still in web form, prior to severing into sheets, and folding the aligned sheets together. The folding is preferably practiced by buckle folding immediately after severing.

The invention may also comprise the further step of placing at least one additional, pre-formed, insert on the formed insert just prior to placing the inserts on the envelope web.

The step of forming interconnected envelope blanks may also be practiced to include die cutting a window opening in each envelope blank, in which case variably imaged address information from an insert sheet is placed on the envelope blank so that it is visible through the window opening. Alternatively, the envelope may be preprinted or variably imaged in roll or web form, or may be printed after formation with the outgoing and/or return address. A die cut patch transparent window is also adhesively applied to the interconnected envelope blanks.

In a preferred embodiment according to the present invention, there is provided a method of automatically forming a mailing envelope with a plurality of contained insert sheets from at least one insert web of paper and an envelope web of paper, comprising the steps of continuously and automatically (a) forming at least one insert from the at least one insert web of paper, including by cutting the web, and folding the insert, to produce a formed insert, (b) forming a plurality of interconnected envelope blanks from the envelope web of paper, (c) forming a window in each of the interconnected envelope blanks, (d) collecting and placing a plurality of insert sheets, including the formed insert, on each of the plurality of interconnected envelope blanks while they are interconnected, in web form, and then (e) while conveying the interconnected blanks in web form, severing the interconnected envelope blanks from each other to produce individual blanks, and forming each individual blank around the inserts placed thereon to produce a final mailing envelope containing a plurality of insert sheets.

In a further preferred embodiment according to the present invention, there is provided a method of automatically forming a mailing envelope with a plurality of contained insert sheets from an envelope web of paper, comprising the steps of continuously and automatically (a) forming a plurality of insert sheets, (b) forming a plurality of interconnected envelope blanks from the envelope web of paper, each blank having a pair of minor flaps generally parallel to each other and on opposite sides of the blank and, after severing, a pair of major flaps generally parallel to each other and on opposite sides of the blank, (c) forming a window in each of the interconnected envelope blanks, (d) collecting and placing the plurality of insert sheets on each of the plurality of interconnected envelope blanks while they are interconnected, in web form, and then (e) conveying the envelope blanks, and during conveyance of the envelope blanks: (e1) plough folding the minor flaps; (e2) severing the interconnected envelope blanks from each other; (e3) applying adhesive to at least some of the flaps; and (e4) plough folding the major flaps, to form a final mailing envelope with a plurality of inserts therein.

In a still further preferred embodiment according to the present invention, there is provided a method of automatically forming a mailing envelope with at least one insert, from an envelope web of paper, comprising the steps of continuously and automatically (a) forming a plurality of interconnected envelope blanks from the envelope web of paper with each blank in landscape mode when the blanks are interconnected, (b) forming a window in each of the interconnected envelope blanks, (c) placing at least one insert on each of the plurality of interconnected envelope blanks while they are interconnected, in web form, and then (d) conveying the interconnected blanks in web form, and while conveying the interconnected blanks, severing the interconnected envelope blanks from each other to produce individual blanks, and forming each individual blank around the at least one insert placed thereon to produce a final mailing envelope containing at least one insert.

In a still further preferred embodiment according to the present invention, there is provided apparatus for automatically forming a mailing envelope with a plurality of contained insert sheets from at least one insert web of paper and an envelope web of paper, comprising means for forming at least one insert from the at least one insert web of paper, including means for cutting the insert from the web, and means for folding the insert to produce a formed insert, means for forming a plurality of interconnected envelope blanks from the envelope web of paper, means for forming a window in each of the interconnected envelope blanks, means for collecting and placing a plurality of inserts on each of the plurality of interconnected envelope blanks while they are interconnected, in web form, means for conveying the interconnected blanks in web form, means for severing the interconnected envelope blanks from each other and means for forming an envelope blank around a formed insert to produce a final mailing envelope containing a plurality of insert sheets.

It is the primary object of the present invention to provide for the effective high speed production of mailing envelopes stuffed with inserts. This and other objects of the invention will become clear from an inspection of the detailed description of the invention, and from the appended claims.

BEST MODE FOR CARRYING OUT THE INVENTION

Figure 1:
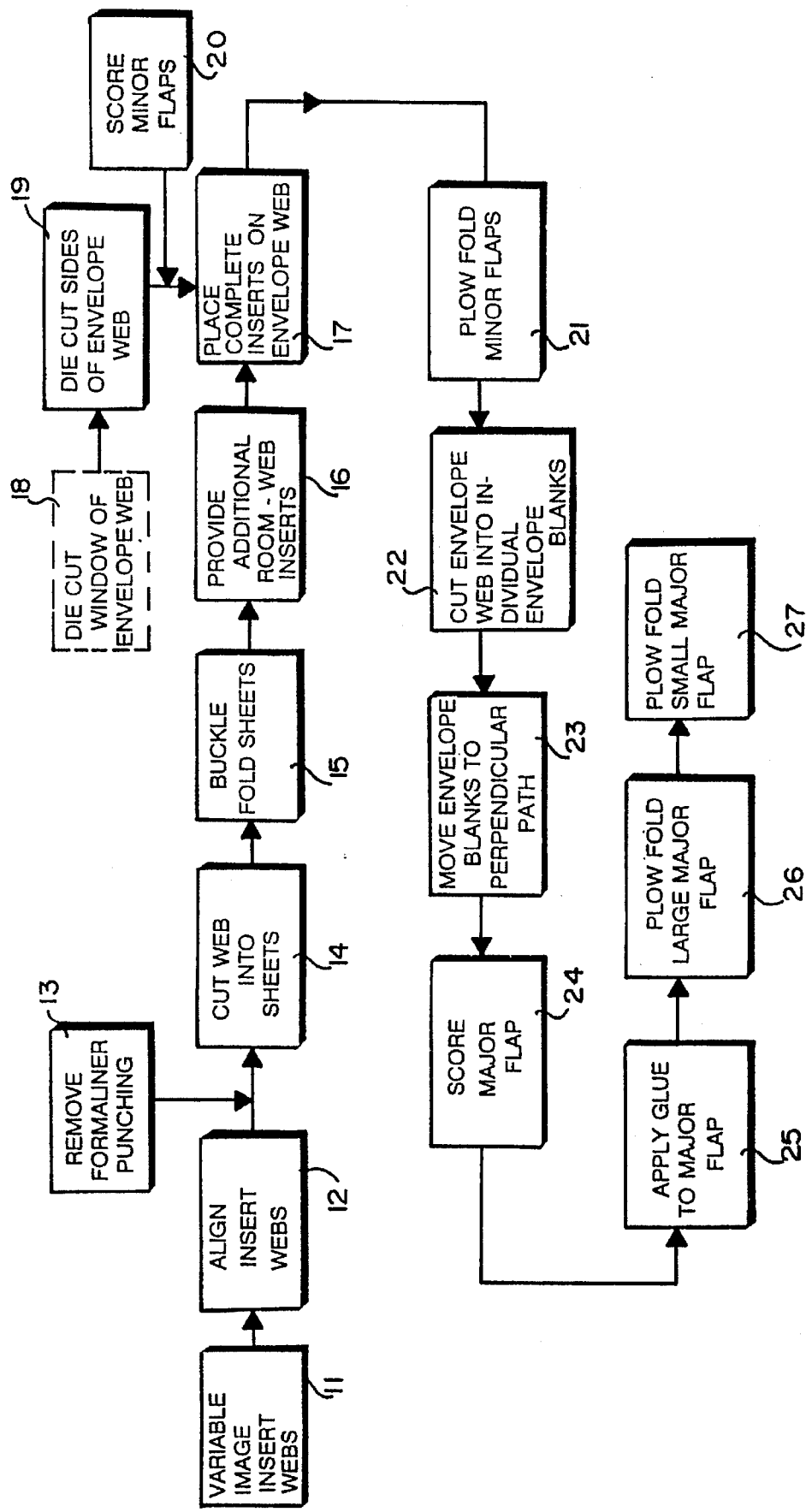
FIG. 1 is a schematic, block, diagram illustrating the various stages in the practice of the exemplary method according to the invention.

FIG. 1 schematically illustrates the various stages of an exemplary method according to the present invention. Practicing the method illustrated in FIG. 1 it is possible to intelligently match up variably imaged multiple insert sheets, and to form a mailing envelope around those insert sheets, in a high speed, efficient, and effective manner. The entire stuffed envelope final product may be constructed from webs of paper directly on site.

The webs of paper that are to be used to form inserts are variably imaged at stage 11 in FIG. 1. Variable imaging may take place on a press at a remote location, or on-line just prior to the webs being further acted upon. The insert webs are aligned at stage 12. Aligning of insert webs is more reliable and efficient, and faster, than collating of individual personalized sheets. After the webs have properly been aligned at stage 12, the formaliner punching associated therewith is removed (slit off) at stage 13, and then the webs are cut into insert sheets at stage 14. A stack of insert sheets, with variable imaging thereon and properly aligned/collated, are then folded together, as at buckle fold stage 15. Then they are conveyed away from the buckle folder for further processing.

In further processing, one or more additional non-web, pre-formed, inserts may be placed upon the inserts formed in stages 12 through 15, as indicated at stage 16 in FIG. 1. After all the inserts have been collected, they are placed on the envelope web, as indicated at stage 17.

The envelope web is also constructed from a roll- of paper. There is the optional, but preferred, step of die cutting a window in the envelope web as indicated at stage 18, and then die cutting the sides of the envelope web as indicated at stage 19. The sides of the web are die cut so that, after severing an envelope blank from the web, the blank has two minor flaps along opposite sides, and two major flaps (a large major flap and a small major flap) along opposite sides. The envelope web is also preferably scored at the minor flaps, as indicated at stage 20, so as to facilitate folding over of the minor flaps later on.

Once all of the inserts have been placed on the envelope web, the minor flaps are plough folded as indicated at stage 21 in FIG. 1. Then the envelope web is cut into individual envelope blanks as indicated at stage 22, the stages 17, 21, and 22 taking place as the envelope blank is being moved in a first direction. Then the individual envelope blanks are transitioned to move in a second direction, substantially transverse to the first direction, typically by first engaging them and moving them at a 45° angle. This movement of the individual envelope blanks to a second, perpendicular, path is illustrated at stage 23 in FIG. 1. While the envelope blanks are moving in the second path, the major flaps are scored as indicated at 24, and then glue is applied to the major flaps as indicated at stage 25. Typically the glue is applied to the small major flap as a strip extending in the second direction (the direction of movement at that time), while glue is applied in transverse spaced strips at the edges of the large major flap.

After glue application, the large major flap is plough folded, as indicated at stage 26, wherein the glue strips thereon come in contact with the minor flaps which have already been folded over, and then the small major flap is plough folded as indicated at 27, the adhesive thereon coming in contact with the large major flap which has previously been folded over. The product resulting is a stuffed envelope, shown generally by reference numeral 29 in FIGS. 9 and 10, having a plurality of insert sheets therein, as indicated schematically by reference numeral 30 in FIG. 9.

Figure 2:
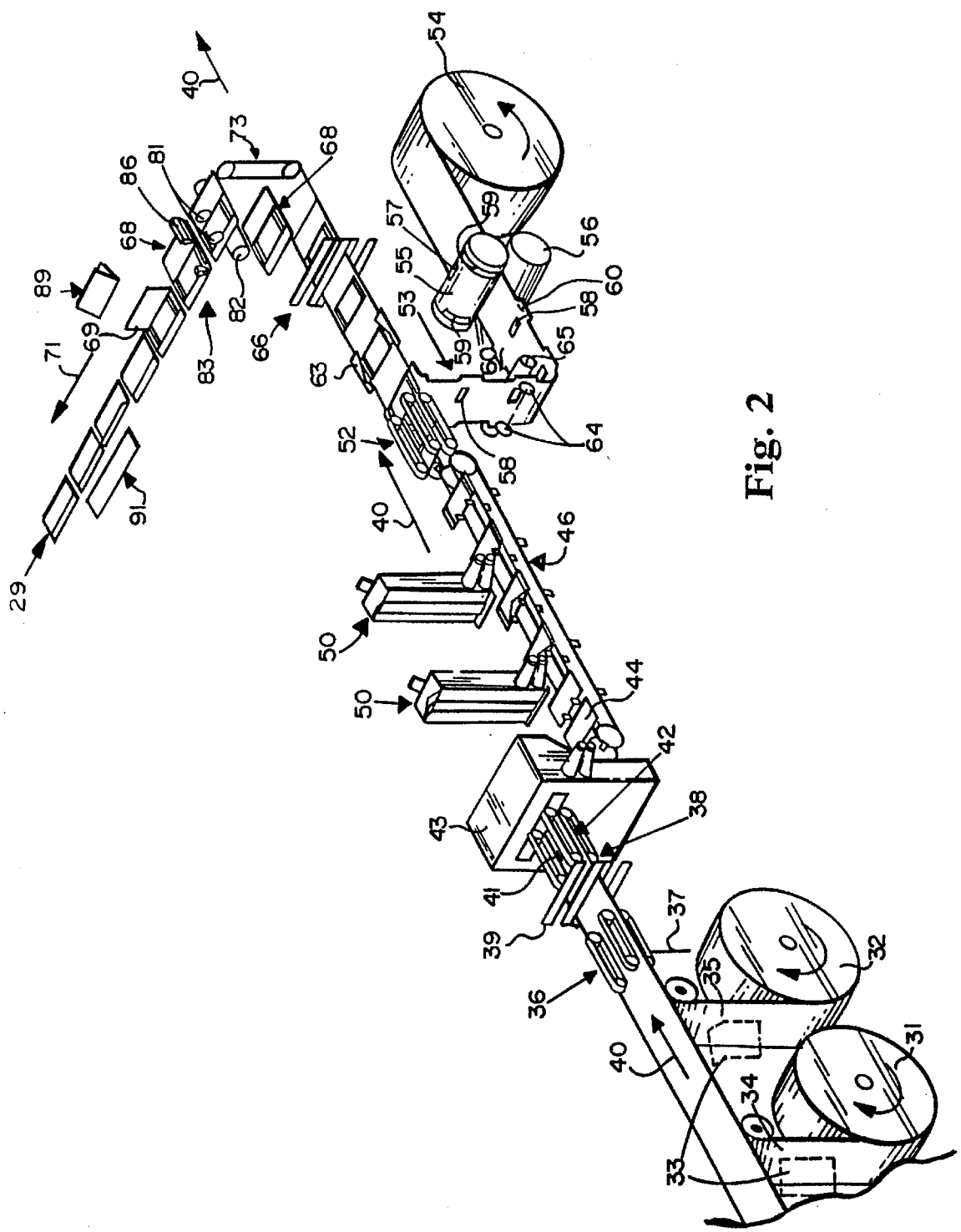
FIG. 2 is a top, schematic, perspective view of exemplary apparatus for practicing an exemplary method according to the present invention.

FIG. 2 schematically illustrates apparatus that is useful in practicing the method schematically illustrated in FIG. 1. One advantage of the invention is that most of the apparatus utilized is conventional and commercially available, although it is used in a unique configuration to achieve the significant advantageous results that are achieved according to the invention.

Reference numerals 31 and 32 in FIG. 2 illustrate two of at least one, and preferably a plurality of (e.g. five), rolled webs of paper that are used to make inserts. The rolls 31, 32 are mounted as conventional on let-off shafts. The paper of the webs 31, 32 can already have been both static and variably imaged (printed) prior to transport to the positions illustrated in FIG. 2, or variable imaging thereof may take place on line if variable imaging takes place on line, printers—such as schematically illustrated by reference numeral 33 in FIG. 2—are associated with each of the webs that may be variably imaged, for example to print address or other personalized information. The printers 33 may be any conventional printers, such as MIDAX ionographic printers.

The webs of paper 34, 35 from the rolls 31, 32, etc. are moved into face-to-face engagement, with the imaged material thereon (particularly the variably imaged material) properly matched up and aligned. Once this alignment is accomplished, as at the conveyors 36, the formaliner punching (tractor feed holes) along both edges of the webs 34, 35 are removed in a conventional manner, as by slitting. A strip of formaliner "punching" that was removed is shown generally at reference numeral 37 in FIG. 2.

Figure 3:
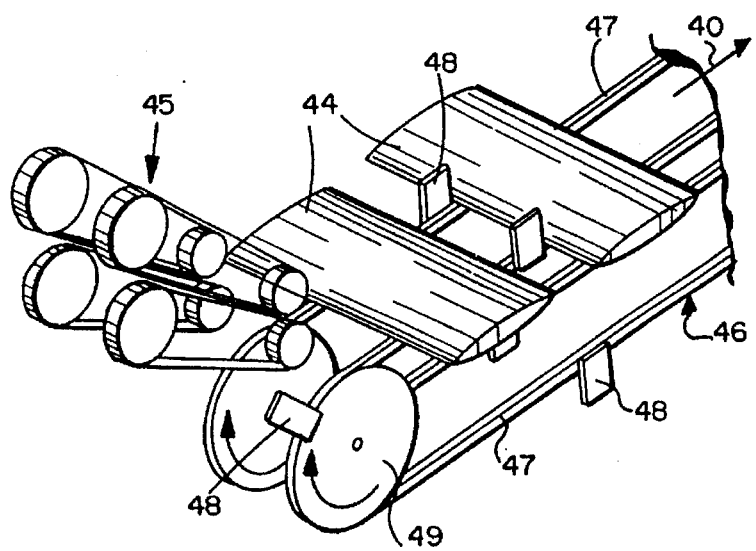
FIG. 3 is a detail top perspective view of the interface between the buckle folder and flighted chain conveyor of the apparatus of FIG. 2.

The aligned/collated webs 34, 35 are then severed into individual stacks of sheets by the conventional cutting means 38. The cutting means 38, as schematically illustrated in FIG. 2, preferably comprises one or more cutting blades 39 that are rotated and moved relative to the webs 34, 35 either as the webs move in a first direction 40; or if a different cutting action is provided, cutting may occur as the webs are temporarily arrested in the movement in the direction 40. The stacked cut sheets formed, shown at 41 in FIG. 2, are then received by the inlet conveyor means 42 for a conventional buckle folder 43, and are buckle folded to produce a folded, formed insert 44 (see FIGS. 2 and 3 in particular) which preferably is of two or more sheets. Each formed insert 44 is discharged in turn by the discharge conveyor 45 (see FIG. 3) of the buckle folder 43, onto a flighted chain transport conveyor, shown generally by reference numeral 46 in FIGS. 2 and 3. This conveyor mechanism 46 includes spaced chains 47 having upstanding lugs or flights 48, the chain 47 received by sprockets or pulleys 49. The flights 48 move into contact with the edge of each formed insert 44 nearest the buckle folder 43, and then are transported in the direction 40. The conveyor 46 preferably operates continuously, and the flights 48 are separated a distance corresponding to the size of the envelope blank with which they will be associated.

While being transported by the conveyor means 46, the formed inserts 44 may have other inserts associated therewith. That is pre-formed, single or multiple sheet, inserts, having a size substantially the same as or less than that of the formed inserts 44, may be placed directly on the tops thereof by one or more conventional insert placers 50. For example the insert placers 50 may be the conventional type having a rotating wheel with four discharge mechanisms, which is indexed into operative association with the tops of the formed inserts 44 as they travel in the direction 40.

Figure 4:
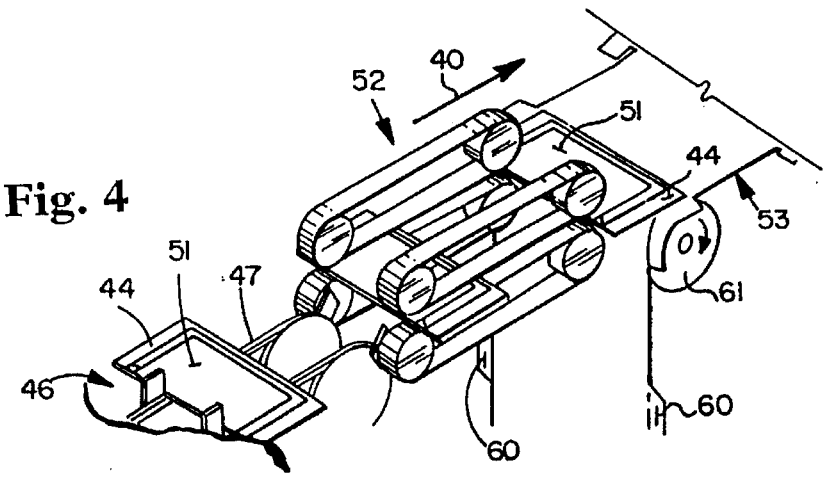
FIG. 4 is a detail top perspective view of the area where the inserts are placed onto the envelope blank web in the apparatus of FIG. 2.

FIG. 4 illustrates a pre-formed insert 51 which has been placed on top of a formed insert 44 just as the pre-formed insert 44 is drawing to the end of the travel of the flighted chain conveyor 46. At the end of the conveyor 46, a transition conveyor 52 is preferably provided, which comprises a plurality of top and bottom belts to positively hold the inserts 44, 51 as they continue to be conveyed in the direction 40 into association with an envelope web shown generally by reference numeral 53 in FIGS. 2 and 4, which has been formed from a roll of paper 54.

The roll of paper 54 is mounted on a conventional let-off shaft, and is acted upon by a die cylinder 55, and an anvil roller 56. The die cylinder 55 may have a die portion 57 for cutting out windows 58 from the envelope web 53, as well as die portions 59 along opposite sides thereof for cutting out the sides of the paper from roll 54, to form a pair of opposed minor flaps 60, on opposite sides of the web 53 and generally parallel to each other. The windows 58 may subsequently be covered with transparent patches, as is conventional, if desired.

At the discharge end of the transition conveyor 52, for example just above the roller 61 (see FIG. 4), the inserts 44, 51 are placed on the web 53, spaced therealong so that one set of inserts 44, 51 is associated with each portion of the envelope web 53 that will become an individual envelope blank.

Figure 5:
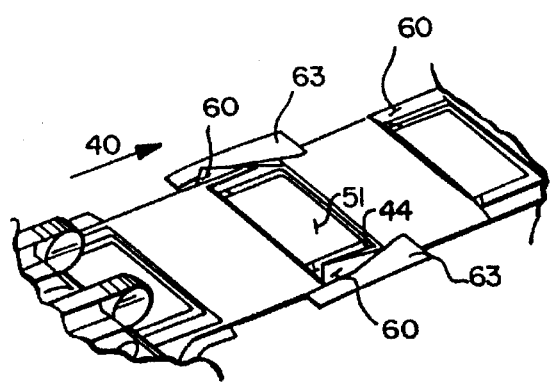
FIG. 5 is an enlarged top perspective view of the area of the apparatus of FIG. 2 where plough folding of the minor flaps takes place.

Shortly after the composite insert 51, 44 is placed on the envelope blank 53, as illustrated most clearly in FIG. 5, the minor flaps 60 are plough folded, using the plough folders 63. The minor flaps 60 may overlap the formed insert 44 side edges, or be spaced therefrom. While in the drawings the insert 44 is shown centered on the envelope, it is preferable that the leading flap 60 (in direction 71) overlap insert 44, rather than being spaced from it, when insert 44 is shorter in length than the blank 53. The insert 44 is typically contained (by compression) under one or both minor flaps 60.

In order to facilitate plough folding of the minor flaps 60, scoring of the web 53 at the flaps 60 typically is provided prior to the plough fold mechanism 63. In the exemplary embodiment illustrated in FIG. 2, scoring is accomplished by utilizing the conventional scoring wheels 64, associated with anvil roll 65, prior to when the web 53 receives the inserts 44 thereon.

Figure 6:
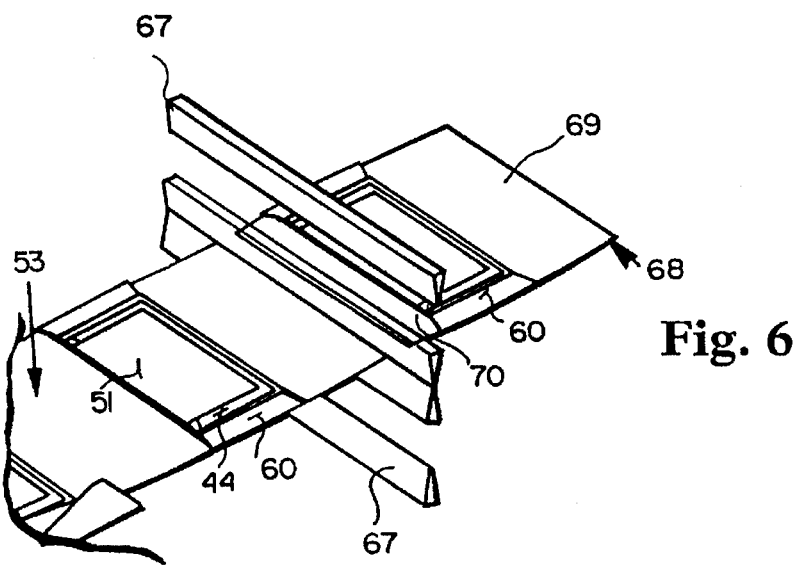
FIG. 6 is a top perspective view of the apparatus of FIG. 2 at the area where severing of the envelope web takes place.

After the minor flaps 60 are plough folded, the web 53 is severed into individual envelope blanks, as indicated generally by cutting mechanism 66 in FIGS. 2 and 6. The cutting mechanism 66 may comprise one or more blades 67, and may have an anvil associated therewith, and may provide a scissors type cutting action, guillotine cutting action, or the like. Typically cutting with the rotating conventional cutting mechanism 66 takes place while the web 53 is moving in the first direction 40, but movement can be temporarily arrested during cutting if a different type of cutting action is used. Conventional conveyor belts (not shown in FIGS. 2 and 6 but similar to belts 52) may be provided for conveying the web 53 in the direction 40 on both sides of the cutting means 66.

Note that the individual envelope blank formed after the web 53 passes to the cutting station 66, shown schematically at 68 in FIG. 6, includes two generally parallel major flaps, on opposite sides of blank 68. Preferably there is a large major flap 69, and a small major flap 70.

In order to continue quick processing of the stuffed envelopes 29 that are produced according to the invention, after formation of the envelope blank 68 it is preferred that the forms being acted upon be moved in a second direction—shown schematically at 71 in FIG. 2—substantially perpendicular to the first direction 40. Alternatively, prior to moving in the second direction 51, glue may be applied along the side edges of the major flap 69, the glue extending in the direction 40, although it is preferred that all the glue be applied at the same location.

Figure 7:
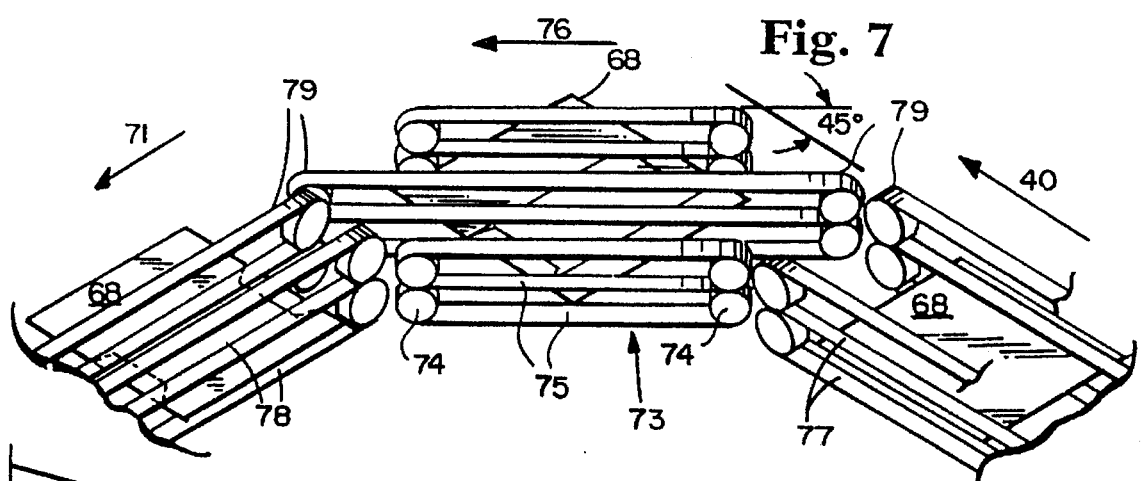
FIG. 7 is a schematic view, with the transported components removed for clarity of illustration, and the top of the angled conveyor shown only in dotted line, of an exemplary transition conveyor of the apparatus of FIG. 2.

In order to move the blank 68 with inserts 51, 44 thereon in the second direction 71 another transition conveyor must be provided. While a wide variety of mechanisms may be used for this purpose, it is preferred that this conveyor—shown schematically by reference numeral 73 in FIGS. 2 and 7—be a conventional type conveyor, similar to 52, which moves the blanks 68 at an angle of about 45° with respect to both the directions 40, 71. A conveyor of this general type is shown in U.S. Pat. No. 5,180,154. For example, as schematically illustrated in FIG. 7, the conveyor 73 may comprise rollers 74, at least one of which is driven, having the angled belts 75 disposed thereon, for moving the blanks 68 in the direction 76, which is at about 450 with respect to the directions 40, 71. Blanks 68 from the conveyor belts 77, which move the blanks 68 in the direction 40, transition onto the belt 75, and once they reach the belts 78 are powered in the direction 71. It is highly desirable during this transition to be sure that the blanks 68 are positively positioned, and the inserts 51, 44 securely held thereon. For that purpose a second conveyor system substantially identical to the conveyors 73, 77, 78 is provided only on top of the forms. The second conveyor is shown at 79 in FIG. 7.

Once the blanks 68 are moving the direction 71—as seen in FIG. 2—scoring of the major flaps 69, 70 first preferably takes place, as by using scoring wheels 81, associated with an anvil roller 82. Then the blanks 68 are moved to the glue station—shown schematically at 83 in FIG. 2—where adhesive is applied.

Figure 10:
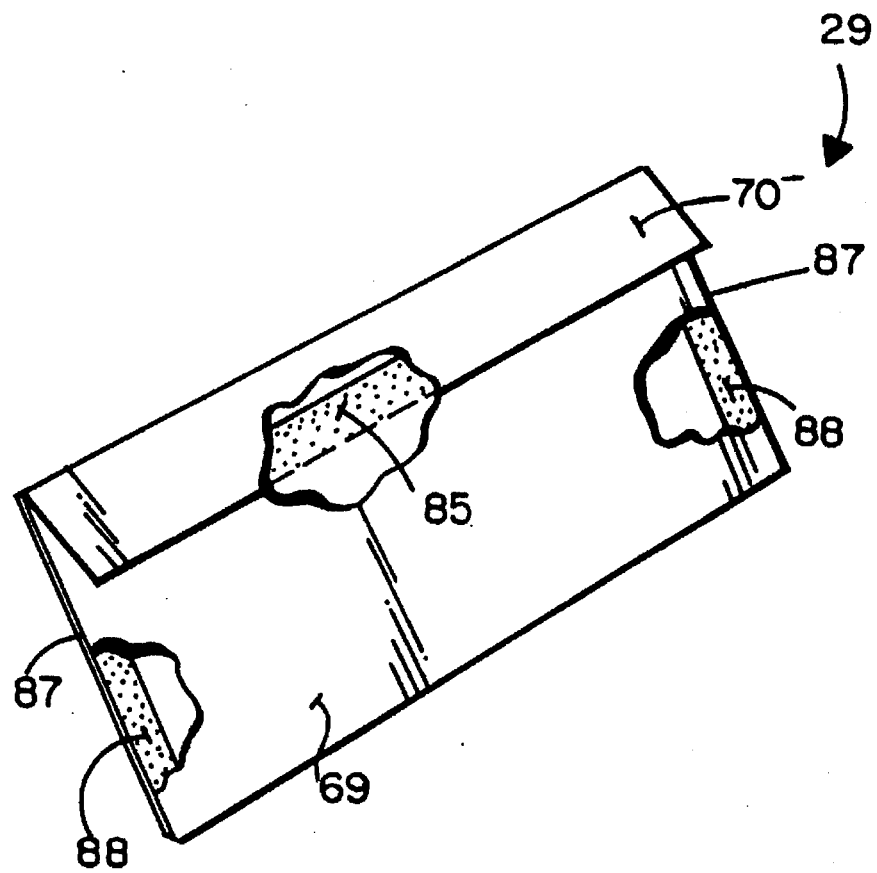
FIG. 10 is a view like that of FIG. 9 only from the rear of the envelope.

Preferably a first strip of adhesive is applied by conventional glue applicator 84 to the small major flap 70, the strip on the flap 70 extending in the direction 71. The strip on the small major flap 70 is illustrated by reference numeral 85 in FIG. 10. At the same time, at the station 83, adhesive is being applied by the conventional applicator 86 at two spaced portions adjacent the side edges of the large major flap 69. FIG. 10 illustrates the side edges 87 of the major flap 69, and shows the adhesive strips 88 which have been applied along the edges 87.

Figure 8:
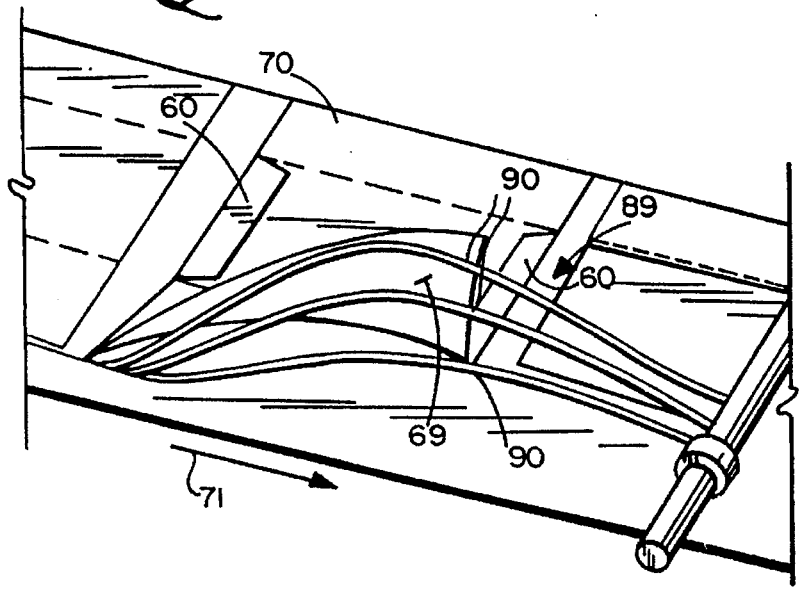
FIG. 8 is a detail schematic view showing an exemplary major large flap plough fold mechanism of the apparatus of FIG. 2.

Once the adhesive has been applied at station 83, the large major flap 69 is plough folded utilizing a conventional plough folding mechanism. The plough folding mechanism is shown generally by reference numeral 89, and is only schematic in FIG. 2, but is shown in more detail in FIG. 8. The major components of the plough folding mechanism 89 are a plurality of bent bars or rods 90, which conform to the path that the flap 69 must take when it is being folded. When the large major flap 69 is plough folded, the adhesive strips 88 thereon come into contact with the folded over minor flaps 60, and become adhesively secured thereto.

As the components continue to move in the direction 71, the small major flap 70 is then plough folded, utilizing the plough folding mechanism shown schematically by reference numeral 91 in FIG. 2. The plough folding mechanism 91 is a mirror image of the mechanism 89 shown in FIG. 8, only because of its typically smaller size, only one or two rods 90 need be provided. After plough folding the small major flap 70, the final stuffed envelope 29 results.

The adhesive that is applied at the station 83 may be of any conventional type, and the exact further processing steps will be determined by the nature of the adhesive. For example if it is aqueous adhesive, the folding action alone (with subsequent pressing rollers if desired) will cause the adhesive to seal. If it is heat sealable adhesive, the envelope 29 can go through a conventional heat sealing mechanism, and if it is pressure cohesive, the envelope 29 may go through a commercially available SPEEDISEALER® sealer sold by Moore Business Forms, Inc. of Lake Forest, Ill.

Figure 9:
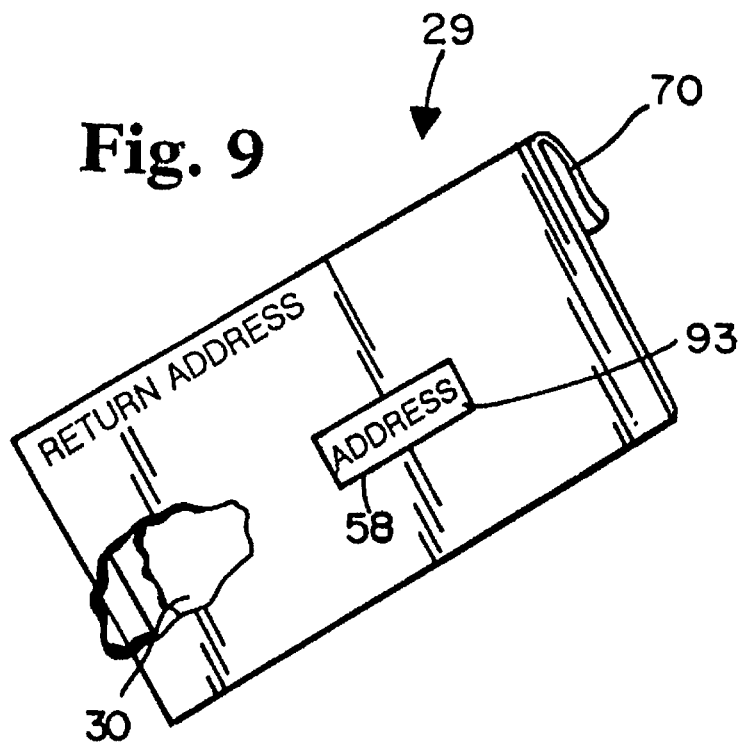
FIG. 9 is a front perspective view, with a portion of the exterior cut away to illustrate the interior components, of an exemplary mailing envelope with contained inserts produced according to the invention.

As seen in FIG. 9, the final stuffed envelope 29, which has the inserts 30 therein (the reference numeral 30 collectively referring to the inserts 44, 51) may have address indicia 93 visible through the window cut out 58. The address indicia 93 was variably imaged on either the top or the bottom web (e.g. webs 34, 35) during formation of the formed insert 44, as with printers 33. When the formed insert 44 was placed on the envelope web 53, this address indicia 93 was in alignment with the cut out 58, and that alignment was maintained during subsequent processing. Thus according to the invention, it is possible to match multiple personalized insert webs, or to intelligently image multiple insert webs on line, collate them in web form, and have them properly disposed in the final stuffed envelopes 29 produced.

The final product 29 can take a wide variety of forms, depending upon the particular construction of the envelope web 53 and how it is cut using the die cylinder. For example, the final envelope 29 may be a remailable type envelope having a detachable outgoing closure flap which when removed enables a return closure flap to be used to seal the envelope for the return. The adhesive for accomplishing this may be applied at any desired point, such as at station 83. Alternatively, no cut out 58 need be provided, and the face of the envelope 29 visible in FIG. 9 may also be preprinted or variably pre-imaged in roll or web form, or may be printed after formation with the outgoing address, and/or the return address.

Figure 11:
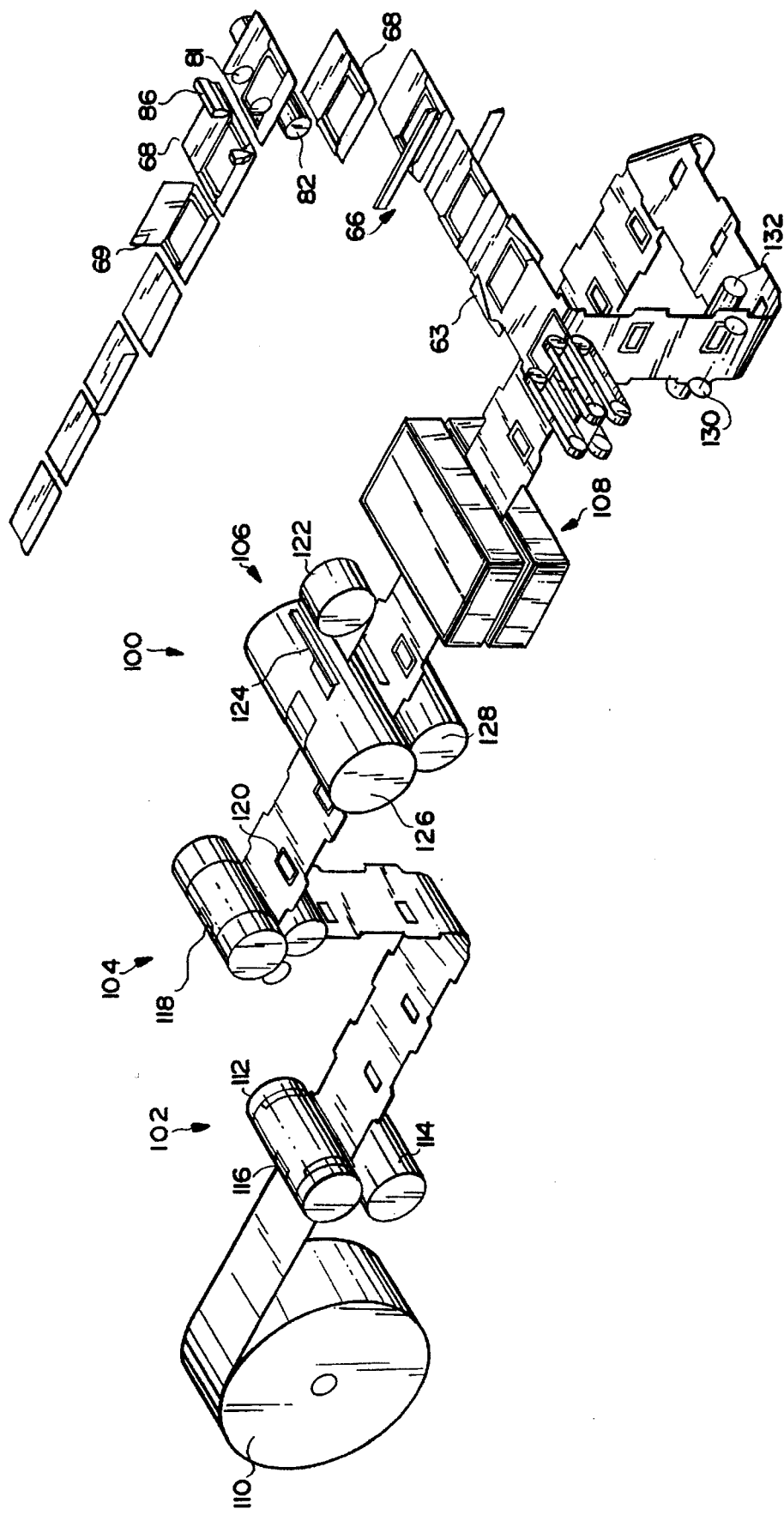
FIG. 11 is a top, schematic perspective view of a die cut window patch module according to the present invention for supplying die cut windows and patches for envelope blanks.

Referring now to FIG. 11, there is illustrated a die cut window patch module, generally designated 100, which may be provided as an option to the apparatus described above. The die cut window patch module enables the user to die cut an address window on a continuous carrier sheet and affix a transparent window patch using ultraviolet adhesive. Module 100 may be provided in lieu of the envelope web forming apparatus 53, illustrated in FIG. 2. Alternatively, the module 100 may be provided in conjunction with the envelope web forming apparatus 53 with one or the other being utilized to provide the mailing envelope with inserts depending upon whether a plain envelope, an envelope with a die cut window or an envelope with a die cut window and window patch is desired.

Module 100 may comprise a die cut unit 102, a glue unit 104, a patch unit 106 and an ultraviolet processor unit 108. Die cut unit 102 is supplied with a web of paper from a roll 110. In the die cut unit 102, the sides of the paper web are die cut so that after severing an envelope blank from the web, the blank has two minor flaps along opposite sides and two major flaps along opposite sides, similarly as previously described. The envelope web may also be scored at the minor flaps to facilitate folding. Additionally, die cut unit 102 has a magnetic top plate cylinder 112 and a hardened bottom anvil cylinder 114. The magnetic top cylinder is size-sensitive and must be changed as envelope repeat size changes. The magnetic cylinder 112 accepts chemically-etched die plates custom configured for a given die cutting operation. The die plate for the die cut window is illustrated at 116. The chafe from the die cut side flap and the window patch slug is suitably removed.

Referring now to the glue unit 104, a photopolymer plate is mounted on a size sensitive plate cylinder equivalent in size to the die cut plate cylinder. The photopolymer plate is dependent upon the window size and the dimension of the film patch which is to be applied to the envelope blank in the web. By passing the web through the nip of the rolls of the glue unit, ultraviolet adhesive is transferred to the envelope blank outlining the die cut window as illustrated at 120.

After the ultraviolet adhesive has been applied to the envelope blank on the web, the web passes through the window patch unit 106. Unit 106 includes a roll of transparent material for forming each of the transparent patches. For example, the roll 122 may be glassine, which is cut into individual patches for application to each envelope blank as the web of envelope blanks passes through the window patch unit 106. A programmable controller, not shown, may be used to cut the window patches to the desired size, the cutting blades being schematically illustrated at 124. Once the window patch is cut, the upper vacuum cylinder 126 of the window patch unit 106 transports the cut window patch into registration with the die cut window and the marginal ultraviolet adhesive applied to the envelope blank about the window. The pressure cylinder 128 which forms the nip with vacuum cylinder 126 through which the web passes has a compression bump so that the transparent patch and margin of the window are pressed together to ensure complete adhesive contact therebetween. The pressure roll 128 is size-sensitive and may be changed as envelope repeats change.

The web with the transparent patch registering with the die cut window and the ultraviolet adhesive passes into the ultraviolet light unit 108. Unit 108 produces an intense ultraviolet light which causes the ultraviolet adhesive to cure instantaneously. This creates an adhesive bond between the outgoing envelope blank and the film patch material. By bonding instantaneously the transparent film patch to the web over the die cut window hole, the web does not incur any loss of lateral strength.

Because the module 100 may be provided as supplement to or in lieu of the envelope forming apparatus 53. the envelope web with the die cut window patches applied is turned by a turn bar and the web is passed through a pair of scoring wheels 130 which bear against an associated anvil roll 132 as the web moves into position for receiving the insert or inserts from the transition conveyor. Thus, after the inserts are supplied on top of the envelope blank web, the folding, cutting and scoring described previously in connection with the apparatus of FIG. 2 is used to complete the formation of the mailing envelope with the inserts. Thus, the parts illustrated downstream of the transition conveyor 52 of FIG. 11 which correspond to like parts in the previously described apparatus illustrated principally in connection with FIG. 2 are designated with like reference numerals.

It will be appreciated that the inserts 30 (the reference numeral 30 collectively referring to the inserts 44, 51) may have address indicia visible through the die cut window with transparent patch applied. The address information, of course, lies in registration with the die cut window when the formed insert is placed on the envelope web.

It will thus be seen that according to the present invention a method and apparatus are provided for quickly, efficiently, and effectively producing mailing envelopes stuffed with a plurality of inserts. The mailing envelopes according to the invention can be constructed primarily from, or exclusively from, rolls of paper, directly on site.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of automatically forming a mailing envelope with a plurality of contained insert sheets from at least one insert web of paper and an envelope web of paper, comprising the steps of continuously and automatically:

(a) forming at least one insert from the at least one insert web of paper, including by cutting the web, and folding the insert, to produce a formed insert;

(b) forming a plurality of interconnected envelope blanks from the envelope web of paper;

(c) forming a window in each of said interconnected envelope blanks;

(d) collecting and placing a plurality of insert sheets, including the formed insert, on each of the plurality of interconnected envelope blanks while they are interconnected, in web form; and then (e) while conveying the interconnected blanks in web form, severing the interconnected envelope blanks from each other to produce individual blanks, and forming each individual blank around the inserts placed thereon to produce a final mailing envelope containing a plurality of insert sheets.

2. A method as recited in claim 1 including applying a transparent window patch to each of said interconnected envelope blanks in registration with the window formed in each said interconnected envelope blanks.

3. A method as recited in claim 1 wherein step (b) is practiced to form each blank so that it has two parallel minor flaps on opposite edges thereof, and after severing has two parallel major flaps on opposite edges thereof.

4. A method as recited in claim 3 wherein step (e) is practiced by the sub-steps of, during conveyance of the envelope blanks in a first direction, sequentially (e1) plough folding over the minor flap; and (e2) severing the leading interconnected blank from the next blank so that both major flaps are free; then changing the direction of conveyance and sequentially (e3) applying adhesive to the major flaps; and (e4) plough folding the major flaps so that adhesive applied thereto comes into contact with the minor flaps and other major flap, to form a sealed mailing envelope containing inserts.

5. A method as recited in claim 4 comprising the further step, prior to steps (d) and (e1) of scoring the envelope blanks at the minor flaps to facilitate plough folding of the minor flaps.

6. A method as recited in claim 5 comprising the further step, just prior to step (e3), of scoring the envelope blanks at the major flaps to facilitate plough folding of the major flaps.

7. A method as recited in claim 4 comprising the further step, just prior to step (e3) of scoring the envelope blanks at the major flaps to facilitate plough folding of the major flaps.

8. A method as recited in claim 4 wherein step (b) is further practiced to form envelope blanks having, after severing, a large major flap and a small major flap, the large and small major flaps having parallel end edges, and each having a pair of side edges generally parallel to the end edges; and wherein step (e3) is practiced by placing adhesive adjacent each of the side edges of the large major flap, and adjacent the end edge of the small major flap.

9. A method as recited in claim 8 wherein step (e4) is practiced by first plough folding the large major flap so that the adhesive thereon comes into contact with the minor flaps; and then plough folding the small major flap so that the adhesive thereon comes into contact with the large major flap.

10. A method as recited in claim 1 wherein step (a) is practiced by forming a plurality of inserts from a plurality of webs of paper; and wherein step (d) is practiced by aligning the inserts while still in web form, prior to severing into sheets, and folding the aligned sheets together.

11. A method as recited in claim 10 wherein the insert webs have formaliner punching along the edge thereof and comprising the further step of removing the formaliner punching from the edges of the webs after alignment, but prior to severing of the webs into insert sheets.

12. A method as recited in claim 10 wherein step (a) is practiced by buckle folding immediately after severing.

13. A method as recited in claim 12 comprising the further step of placing at least one additional, preformed, insert on the formed insert just prior to placing the inserts on the envelope web.

14. A method as recited in claim 10 wherein step (d) is practiced to place a plurality of insert sheets from step (a), and only insert sheets formed in step (a), on the envelope web.

15. A method as recited in claim 10 wherein steps (a) and (d) are practiced so that variably imaged address information from an insert sheet is placed on the envelope blank so that it is visible through the window.

16. A method as recited in claim 1 comprising the further step of variably imaging a plurality of insert webs of paper, and wherein steps (a) and (d) are practiced to match up corresponding variably imaged insert sheets for each final envelope construction.

17. A method as recited in claim 1 wherein said forming of each individual blank around the inserts pursuant to step (e) is practiced solely by plough folding.

18. A method of automatically forming a mailing envelope with a plurality of contained insert sheets from an envelope web of paper, comprising the steps of continuously and automatically:
(a) forming a plurality of insert sheets;
(b) forming a plurality of interconnected envelope blanks from the envelope web of paper, each blank having a pair of minor flaps generally parallel to each other and on opposite sides of the blank and, after severing, a pair of major flaps generally parallel to each other and on opposite sides of the blank;
(c) forming a window in each of said interconnected envelope blanks;
(d) collecting and placing the plurality of insert sheets on each of the plurality of interconnected envelope blanks while they are interconnected, in web form; and then
(e) conveying the envelope blanks, and during conveyance of the envelope blanks: (e1) plough folding the minor flaps; (e2) severing the interconnected envelope blanks from each other; (e3) applying adhesive to at least some of the flaps; and (e4) plough folding the major flaps, to form a final mailing envelope with a plurality of inserts therein.

19. A method as recited claim 18 including applying a transparent window patch to each of said interconnected envelope blanks in registration with the window formed in each of said interconnected envelope blanks.

20. A method as recited in claim 18 wherein step (b) is further practiced to form envelope blanks having, after severing, a large major flap and a small major flap, the large and small major flaps having parallel end edges, and each having a pair of side edges generally parallel to the end edges; and wherein step (e3) is practiced by placing adhesive adjacent each of the side edges of the large major flap, and adjacent the end edge of the small major flap, no other adhesive placement being provided.

21. A method as recited in claim 20 wherein the step (e4) is practiced by first plough folding the large major flap so that the adhesive thereon comes into contact with the minor flap; and then plough folding the small major flap so that the adhesive thereon comes into contact with the large major flap.

22. A method as recited in claim 18 comprising the further step, prior to steps (d) and (e1) of scoring the envelope blanks at the minor flaps to facilitate plough folding of the minor flaps.

23. A method as recited in claim 18 comprising the further step, just prior to step (e3), of scoring the envelope blanks at the major flaps to facilitate plough folding of the major flaps.

24. A method as recited in claim 18 wherein steps (e1)–(e4) are practiced sequentially.

25. A method as recited in claim 18 wherein steps (a) and (d) are practiced so that variably imaged addressed information from an insert sheet is placed on the envelope blank so that it is visible through the window.

26. A method as recited in claim 18 wherein steps (e1) and (e2) are practiced while conveying the envelope blank, with insert sheets thereon, in a first direction, and wherein the steps (e3) and (e4) are practiced while conveying the envelope blank, with insert sheets thereon, in a second direction, generally transverse to the first direction.

27. A method as recited in claim 26 comprising the further step of, after severing each envelope blank, conveying each blank at a substantially 45° angle with respect to the first direction before conveying it in the second direction.

28. A method of automatically forming a mailing envelope with at least one insert, from an envelope web of paper, comprising the steps of continuously and automatically:
(a) forming a plurality of interconnected envelope blanks from the envelope web of paper with each blank having long and short edges and interconnected in the web along the long edges;
(b) forming a window in each of said interconnected envelope blanks;
(c) placing at least one insert having long and short edges on each of the plurality of interconnected envelope blanks while they are interconnected, in web form with the long and short edges of said insert lying generally parallel to the long and short edges of said blanks; and then
(d) conveying the interconnected blanks in web form in a direction parallel to said short edges, and while conveying the interconnected blanks, severing the interconnected envelope blanks from each other to produce individual blanks, and forming each individual blank around the at least one insert placed thereon including plough folding the short edges as the blanks are conveyed to produce a final mailing envelope containing at least one insert.

29. A method as recited in claim 28 wherein step (a) is practiced to form each blank so that it has two parallel minor flaps along said short edges thereof only, and disposed at the sides of each of the landscape mode blanks after severing has two parallel major flaps along said long edges thereof, perpendicular to the short edges, changing the direction of conveyance and then plough folding the long edges.

30. A method of automatically forming a mailing envelope with at least one insert, from an envelope web of paper, comprising the steps of continuously and automatically:
(a) forming a plurality of interconnected envelope blanks from the envelope web of paper with each blank in landscape mode when the blanks are interconnected;
(b) forming a window in each of said interconnected envelope blanks;
(c) placing at least one insert on each of the plurality of interconnected envelope blanks while they are interconnected, in web form; and then
(d) conveying the interconnected blanks in web form, and while conveying the interconnected blanks, severing the interconnected envelope blanks from each other to produce individual blanks, and forming each individual blank around the at least one insert placed thereon to produce a final mailing envelope containing at least one insert;

wherein step (a) is practiced to form each blank so that it has two parallel minor flaps on opposite first edges thereof only, and disposed at the sides of each of the landscape mode blanks after severing has two parallel major flaps on opposite second edge thereof, perpendicular to the first edges; and wherein step (d) is practiced by the sub-steps of, during conveyance of the envelope blanks in a first direction, sequentially (d1) plough folding over the minor flaps; and (d2) severing the leading interconnected blank from the next blank so that both major flaps are free; then changing the direction of conveyance and sequentially (d3) applying adhesive to the major flaps; and (d4) plough folding the major flaps so that adhesive applied thereto comes into contact with the minor flaps and the other major flap, to form a sealed mailing envelope containing said at least one insert.

31. A method as recited in claim 30 comprising the further step of scoring the envelope blanks at the minor and major flaps thereof prior to plough folding, to facilitate plough folding.

32. A method as recited in claim 30 wherein step (d1) is practiced to fold at least one minor flap over the insert to assist in holding the insert in place during subsequent processing.

33. Apparatus for automatically forming a mailing envelope with a plurality of contained insert sheets from at least one insert web of paper and an envelope web of paper, comprising:
means for forming at least one insert from the at least one insert web of paper, including means for cutting the insert from the web, and means for folding the insert to produce a formed insert;
means for forming a plurality of interconnected envelope blanks from the envelope web of paper;
means for forming a window in each of the interconnected envelope blanks;
means for collecting and placing a plurality of inserts on each of the plurality of interconnected envelope blanks while they are interconnected, in web form;
means for conveying the interconnected blanks in web form;
means for severing the interconnected envelope blanks from each other; and
means for forming an envelope blank around a formed insert to produce a final mailing envelope containing a plurality of insert sheets.

34. Apparatus according to claim 33 including means for applying a transparent window patch to each of said interconnected envelope blanks in registration with the window formed in each of said interconnected envelope blanks.

35. Apparatus according to claim 33 including means for variably imaging indicia on at least one of the plurality of insert webs of paper and means for aligning the variably imaged one insert with said window.

* * * * *